United States Patent [19]

Yamada et al.

[11] Patent Number: 4,691,053

[45] Date of Patent: Sep. 1, 1987

[54] PROCESS FOR PRODUCING ORGANIC COMPOUNDS BY UTILIZING OXYGENIC COMPLEXES

[75] Inventors: Mutsuo Yamada; Yasuyuki Nishimura; Yoshijiro Arikawa; Takanori Kuwahara; Taiji Kamiguchi; Hirotoshi Tanimoto, all of Kure, Japan

[73] Assignee: Babcock-Hitachi Kabushiki Kaisha, Tokyo, Japan

[21] Appl. No.: 617,187

[22] Filed: Jun. 4, 1984

[30] Foreign Application Priority Data

Jun. 3, 1983 [JP] Japan .................................. 58-99022
Feb. 29, 1984 [JP] Japan .................................. 59-38137

[51] Int. Cl.⁴ .................... C07C 45/38; C07C 51/235; C07C 51/255; C07C 45/39; C07C 45/34; C07D 307/89; C07D 307/34; B01J 31/18

[52] U.S. Cl. .................................. 562/531; 570/230; 502/162; 502/165; 562/535; 562/412; 562/416; 562/421; 562/533; 562/536; 562/400; 562/532; 562/534; 549/248; 549/257; 558/320; 558/321; 558/323; 560/261; 568/386; 568/402; 568/471; 568/475; 568/802; 568/836; 568/837

[58] Field of Search ................ 502/162, 165; 560/130; 562/536, 421, 531, 533, 400, 532, 534, 535

[56] References Cited

U.S. PATENT DOCUMENTS

| | | | |
|---|---|---|---|
| 3,103,535 | 9/1963 | Whitfield et al. | 562/531 |
| 3,459,780 | 8/1969 | Wilkinson | 562/531 X |
| 4,022,841 | 5/1977 | Angstadt et al. | 502/165 X |
| 4,104,312 | 8/1978 | Angstadt et al. | 568/570 |
| 4,155,879 | 5/1979 | Mimoun et al. | 502/165 X |

*Primary Examiner*—James H. Reamer
*Assistant Examiner*—Patricia M. Scott
*Attorney, Agent, or Firm*—Fay, Sharpe, Beall, Fagan, Minnich & McKee

[57] ABSTRACT

A novel process for producing oxygen-containing organic compounds with high selectivity and good yield by oxidizing organic compounds under mild conditions is provided, which process comprises using as a catalyst for the oxidation, a complex ($M_mX_n.L_l$) consisting of a transition metal compound ($M_mX_n$) and an organic phosphorous compound (L) as a ligand, wherein M represents a transition metal belonging to group I, group IV~VII or iron group in group VIII of the periodic table; X represents an anion such as a halogen; ligand L represents an organic phosphorous compound; and m and n mean a number of the atomic valence of said transition metal (ion) M and said anion X, respectively, and l means a number of said ligand.

9 Claims, 1 Drawing Figure

PROCESS FOR PRODUCING ORGANIC COMPOUNDS BY UTILIZING OXYGENIC COMPLEXES

BACKGROUND OF THE INVENTION

1. Field of the Invention

This invention relates to a process for producing organic compounds by utilizing oxygen complexes as oxidizing agents, and more particularly it relates to a process for producing oxygen-containing organic compounds by the use of oxygen complexes.

2. Description of the Prior Art

Acetic acid and aldehydes as basic chemicals for petrochemical industry have been produced by oxidation reactions of suitable organic substrates as raw materials. Such oxidation reactions occupy an important situation among reaction processes having been employed in the petrochemical industry. These oxidation reactions, however, have so far been carried out under high temperatures and high pressures, and by-products are generally formed at the same time; the improvement of the selectivity and yield of such reactions has become an important problem. For example, in the preparation of carboxylic acids from aldehydes, an oxygen-oxidation process using transition metal ions such as ions of Co, Mn, etc. as catalyst has been practically employed. The reaction mechanisms of the process considered to be that a metal ion is first oxidized with oxygen into a high valence state ion such as Co(3) or Mn(3), followed by oxidizing aldehydes by means of the Co(3) or Mn(3). However, it has been said that the processes are complicated reactions accompanied with radical formation and since the reaction temperature must be controlled in the vicinity of 50° to 70° C. because the oxidation reaction further advances to produce such by-products as formic acid and $CO_2$. Thus, high yield cannot be expected, and complicated separation steps are required for purification of the resulting product.

On the other hand, as to the oxygen complexes functioning as an effective oxidizing agent for oxidation reactions of organic sustances, various studies have been made as model reactions of the respiratory reaction of living bodies. For example, there are iron-protein and copper-protein compounds in mammals and molluscs, respectively. These are complex compounds consisting of the protein and divalent iron or monovalent copper ion.

Usually, in the case of metal ions capable of taking various valences, the low valence ions thereof are contacted with oxygen to form high valence metal ions through oxidation, as expressed by the following equations:

$$Cu(1) + \tfrac{1}{4}O_2 + \tfrac{1}{2}H_2O \rightarrow Cu(2) + OH^- \quad (1)$$

$$Fe(2) + \tfrac{1}{4}O_2 + \tfrac{1}{2}H_2O \rightarrow Fe(3) + OH^- \quad (2)$$

However, in the case of hemoglobin or hemocyanin wherein Fe(2) or Cu(1) is reacted with a protein in advance to form a protein complex, it has been known that even if such a complex is contacted with oxygen, there occurs no direct oxidation reaction of metal ions, but oxygen in the form of molecule is coordinated with metal ions in the complex (i.e. formation of an oxygen complex), as follows ("chemistry of metal proteins" in Japanese, edited by Ohtsuka and Yamanaka, Kohdansha (1983)):

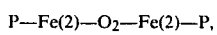

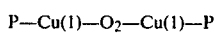 (3)

wherein P represents a protein.

The oxygen molecule thus combined is activated by its coordination with metal ions, to have a performance of oxidizing of various organic substances at low temperatures such as the body temperature of living bodies, and its reaction heat constitutes the energy source of living bodies. However, if such a protein complex is separated from living bodies, it becomes unstable, and the metal ion is readily oxygen-oxidized to higher valence state. Thus, with respect to its application to industrial oxidation reactions, it is a big problem to employ an artificial compound as a complexing agent and to combine this compound with a suitable transition metal to thereby producing a complex capable of forming a stable oxygen complex.

The object of the present invention is to solve the above problem and provide a process for oxidizing organic compounds by which aimed oxygen-containing organic compounds can be produced with a high selectivity and a good yield.

SUMMARY OF THE INVENTION

The present invention, in short, consists in a process for producing oxygen-containing organic compounds, which comprises using as a catalyst, a transition metal complex capable of forming an oxygen complex by coordination of oxygen molecule therewith, and oxidizing of organic compounds as a substrate with the combined oxygen in the oxygen complex under mild conditions.

Concretely the present invention resides in the following process:

In the process for producing oxygen-containing organic compounds by oxidizing organic compounds in the presence of a catalyst which activates oxygen through formation of an oxygen complex, the improvement which comprises using as said catalyst, a complex ($M_mX_n \cdot L_l$) consisting of a transition metal compound ($M_mX_n$) and an organic phosphorous compound (L) as a ligand, wherein M represents a transition metal belonging to a group consisting of group I, groups IV~VII and iron group in group VIII of the periodic table; X represents an anion; L represents a ligand of an organic phosphorous compound; m and n mean the number of atoms of said transiton metal (ion) M and said anion X, respectively, and l means the number of said ligand.

DESCRIPTION OF THE PREFERRED EMBODIMENTS

Figure 1:
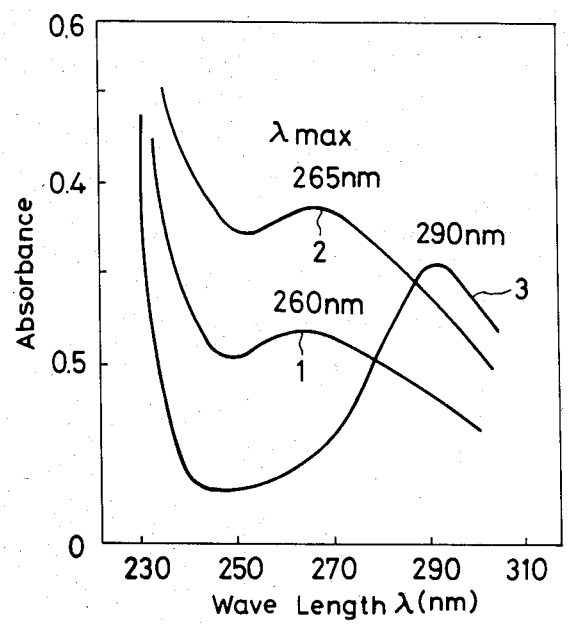
FIG. 1 shows a view illustrating absorption spectra of complexes used in the present invention.

In the above complex, of the present invention, X is preferably an anion such as $Cl^-$, $Br^-$, $I^-$ or anions $BF_4^-$, $PF_6^-$, $SO_4^{2-}$, $CH_3COO^-$; the organic phosphorous compound as ligand L is preferably a compound represented by alkoxy, alkyl or amide derivatives of phosphorous acid or phosphoric acid; and m, n and l are preferably in the range of 1 to 4, respectively.

The present inventors have made extensive research on compounds capable of forming a stable oxygen complex in combination thereof with a suitable transition metal, in the above oxygen-oxidization of organic compounds, and as a result, have found that as a representative example, a complex of cuprous chloride Cu(1)Cl with a phosphoric acid derivative, hexamethylphosphoramide (other name: tris(dimethylamino)phosphinoxide, hereinafter abbreviated to "hmpa"), can form a stable oxygen complex, and also have confirmed that the oxygen combined therewith functions as an effective oxydizing agent for organic substrates.

When Cu(1)Cl is added to liquid hmpa, a 1:1 complex is formed as follows:

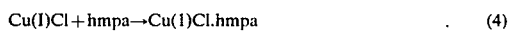

Cu(I)Cl + hmpa → Cu(1)Cl.hmpa (4)

and such a complex is expressed by the general formula $M_mX_n.L_l$ where m=1, n=1 and l=1. In addition, in the case where the central transition metal is Ti(3) or V(3) and the anion is e.g. Cl⁻, m=1, n=3 and l=1 are applied to said formula.

As to the resulting complex, in the case where the liquid ligand, hmpa (m.p. 7° C., b.p. 233° C./760 mm Hg) itself is present in excess, the complex dissolves well therein. Further, the complex also dissolves in n-hexane, toluene, cyclohexane, methyl isobutyl ketone, cyclohexanone, ethanol, ethylene glycol, butylacetate, propylenecarbonate, chloroform, chlorobenzene, triethylamine, pyridine, ethyl methyl sulfoxide, diphenyl sulfone, sulfolane, fluorinated toluene, benzotrifluoride, furan, tetrahydrofuran, etc.

The ethyl alchol solution of Cu(1)Cl.hmpa complex exhibits a pale yellow color and its absorption spectrum thus its maximum absorption at 260 nm, as shown as numeral 1 in FIG. 1. When oxygen or air is passed through the solution, the absorbance increases and the maximum absorption appears at 265 nm (see FIG. 1, numeral 2) with a green color being exhibited. This was at first assumed to be a complex of Cu(2) formed by oxidation of Cu(1) with oxygen. However, when a complex solution of cupric chloride (Cu(2)Cl₂) and hmpa was prepared and its spectra were measured, the spectra exhibited a notable difference from that of Cu(1)Cl.hmpa or its solution having oxygen absorbed therein, that is, had its maximum absorption at 290 mm, as shown in FIG. 1, as numeral 3, and the solution exhibited a red-brown color. This notable difference of the color of the former solution from that of the Cu(1)Cl.hmpa solution is considered to be due to formation of the so-called oxygen complex having oxygen molecule coordinated with the former.

In addition, the amount of oxygen absorbed, of a solution containing a definite concentration of the Cu(1)Cl.hmpa complex was measured, and as a result it was found that the molar ratio of absorbed oxygen to Cu(1) was 2:1; hence the compound having its maximum absorption at 265 mm and exhibiting a green color was a novel oxygen complex having the following structure, as seen in the case of an oxygen complex of Cu(1)-hemocyanin:

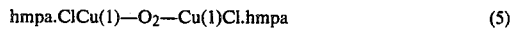

hmpa.ClCu(1)—O₂—Cu(1)Cl.hmpa (5)

A specific feature of this oxygen complex consists in that the coordinated O₂ does not separate from the complex even when it is heated or deaerated under reduced pressure. Thus, if free oxygen in the solution is removed in advance, it is possible to avoid danger of explosion due to direct mixing of organic substances with O₂ gas, since no free O₂ is contained in the catalyst solution. Further, the complex is stable as compared with a complex in the case of copper-protein, so that it requires boiling at 100° C. for oxidizing Cu(1) into Cu(2) with the combined oxygen in the complex. Further, it has been found that the present oxygen complex selectively oxidizes organic substances by means of the combined oxygen under mild conditions to give objective new oxygen-containing organic compounds with a high yield.

For example, when the present oxygen complex is applied to oxidation of acetaldehyde (CH₃CHO), acetic acid is formed as expressed by the following equation:

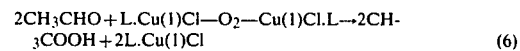

2CH₃CHO + L.Cu(1)Cl—O₂—Cu(1)Cl.L → 2CH₃COOH + 2L.Cu(1)Cl (6)

wherein L represents hmpa as a ligand.

Since this reaction proceeds even at a low temperature in the vicinity of 40° C. as described later in Examples, acetic acid is obtained with a high yield and a small amount of byproduct. Since the material functioning as an oxidizing agent is the oxygen activated by coordination, the valence of the transition metal ion is unchanged, and the oxygen complex is returned to the original Cu(1)Cl.hmpa complex, when the latter complex has oxygen absorbed, it is able to reproduce the effective oxygen complex. Since the oxygen absorption of Cu(1)Cl.hmpa is selective, the complex has a specific feature that when air is passed therethrough as an oxygen source, the oxygen complex can be easily formed. Namely Cu(1)Cl.hmpa functions as a catalyst for activating oxygen. In addition, since oxygen is selectively absorbed even when air is used as an oxygen source, the effectiveness is all the same as in the case where pure oxygen is used, which is advantageous in cost.

The present invention can be applied to various oxidation reactions by which organic compounds as substrate are oxygen-oxidized into the corresponding oxygen-containing organic compounds. Preferable application examples thereof are reactions from aldehydes into the corresponding organic acids such as from acetaldehyde into acetic acid; from propionaldehyde into propionic acid; from acrolein into acrylic acid; from benzaldehyde into benzoic acid; from primary alcohols such as ethyl alcohol into aldehydes such as acetaldehyde; from secondary alcohols such as isopropyl alcohol into ketones such as acetone; and from cumene, etc. into phenol and acetone, etc. Further, the present invention can be also applied to various synthetic reactions, if necessary, in combination of the present complex catalyst with other complex catalysts. Examples of such reactions are those from olefins such as ethylene, propylene, etc. into aldehydes such as acetaldehyde, acetone, etc.; from LPG, butane, naphtha, etc. into acetic acid; from propylene and ammonia into acrylonitrile; from ethylene and HCl into vinyl chloride; from ethylene and acetic acid into vinyl acetate; from benzene into maleic anhydride; from toluene into benzoic acid; from naphthalene into phthalic anhydride; from o-xylene into phthalic anhydride; from p-xylene into terephthalic acid; and from cyclohexane into cyclohexanol.

The metal M of the transition metal compounds ($M_mX_n$) from which the oxygen complex of the present invention is formed is preferred to be Cu and Ag of Group I of the periodic table, Ti and Zr of Group IV thereof, V and Nb of Group V thereof, Cr, Mo and W of Group VII thereof and Fe, Co and Ni of Group VIII thereof, and particularly preferred to be Cu(1), Ti(3) and V(3). Further, examples of X of the transition metal compounds are anions such as $BF_4^-$, $PF_6^-$, $SO_4^{2-}$, $CH_3COO^-$, etc., and particularly $Cl^-$, $Br^-$ and $I^-$.

The ligand L is preferred to be an organic phosphorus compound represented by phosphorous acid derivatives such as mono-, di- or triesters formed by reactions of phosphorous acid with methanol, ethanol or the like, phenylphosphinic acid esters, dimethylphosphinous acid esters, triethylphosphine, triphenylphosphine, etc., phosphoric acid derivatives such as triphenylphosphine oxide, hexamethylphosphoramide, hexaethylphosphoramide, and mono-, di- or triesters formed by reactions of phosphoric acid with methanol, ethanol or the like, and further dimethyl methylphosphonate, methyl dimethylphosphinate, etc., and particularly preferred to be hexamethylphosphoramide.

As for the solvent used when the reaction is carried out in solution state, those which dissolve the complex and at the same time are easily separated from the resulting oxygen-containing organic compounds are preferred. Thus, there is used at least one compound selected from the group consisting of aliphatic, aromatic or alicyclic hydrocarbons, alcohols, ethers, ketones, glycols, carbonates, sulfones, nitriles, oxygen-containing organic compounds, organic halide compounds, nitrogen-containing compounds, organic sulfur compounds, organic flurorine compounds and heterocyclic compounds. If the ligand L is liquid, it is also possible to use this ligand itself as the solvent.

Further, it is also possible to have the complex, which oxygen complex is formed through oxygen absorption, supported on a porous carrier such as active carbon, silicates, porous glass, or polymers having a network structure, and carry out the oxidation reaction.

The present invention will be further described by way of Examples. The values of gas volume in Examples are those under standard conditions.

EXAMPLE 1

Into a 1 l capacity reaction tube were fed Cu(1)Cl (5 g, 50 mmols) and hmpa (515 g) to prepare a complex solution (50 ml) of Cu(1)Cl.hmpa (0.1 mol/l). When air (3.0 l) was passed through the solution, oxygen (0.55 l, 24.5 mmols) was absorbed therein. $N_2$ gas was then passed therethrough. As a result, only the oxygen physically dissolved in the liquid phase part of the reactor was removed, but separation of oxygen from the combined oxygen in the oxygen complex was not observed. Namely the oxygen absorption reaction is irreversible. This is a great specific feature with respect to safety in practical processes. Acetaldehyde (10 g, 227 mmols) was added to the above solution, and the mixture was warmed to 40° C. under the atmospheric pressure. After reaction for 2 hours, the reaction solution was analyzed according to gas chromatography. As a result, acetic acid (2.8 g, 47 mmols) was produced. The reaction of acetaldelyde with the oxygen complex is carried out according to the above equation (6), and in this Example since acetaldehyde is present in excess, the amount of acetic acid formed is regulated by the concentration of the oxygen complex. Thus the conversion of acetaldehyde into acetic acid was 96% based on the concentration of the combined oxygen in the oxygen complex, and the oxidation reaction advanced nearly quantitatively.

EXAMPLE 2

Example 1 was repeated except that the reaction was carried out at 60° C. for one hour. The amount of acetic acid formed was 2.9 g (48 mmols). Thus it was found that when the reaction temperature was raised from 40° C. to 60° C., the reaction rate increased and the yield amounted to 98% in a short time.

EXAMPLE 3

Example 1 was repeated except that acetaldehyde (0.9 g, 20 mmols) was added and the reaction was carried out at 60° C. for one hour. In this case, since the oxygen complex is present in excess, the yield of acetic acid is regulated by the acetaldehyde concentration. The yield of acetic acid based on acetaldehyde in this Example amounted to 98%. Namely it was observed that the reaction advanced nearly quantitatively, as in the previous Example.

EXAMPLE 4

In Example 2, acetaldehyde was in advance added to the solution of Cu(1)Cl.hmpa, and air was then passed through the solution to carry out the oxidation experiment under the same conditions as in Example 2. Conversion was 96%. Further, when air and acetaldehyde in amounts within the explosion limit were at the same time passed through the solution in a ratio of (the amount of the reaction solution)/(the rate of gas passed)=60 $h^{-1}$, 86% of acetaldehyde was oxidized into acetaldehyde.

EXAMPLE 5

In Example 1, the amount of hmpa added was changed to 17.3 g to form Cu(1)Cl.hmpa complex, followed by adding toluene to prepare a toluene solution of Cu(1)Cl.hmpa complex. Reaction was then carried out under the same conditions as in Example 2 to obtain a yield of 97%. Thus even when the solvent was changed to toluene, the acetic acid yield was almost the same.

EXAMPLE 6

Reaction was carried out under the same conditions as in Example 2 except that propionaldehyde (10 g, 172 mmols) was added, to obtain propionic acid (3.4 g, 46 mmols). Its yield based on the oxygen complex was 94%, which result shows that propionaldehyde was oxidized at the same rate and selectivity as those in the case of acetaldehyde.

EXAMPLE 7

Vanadium trichloride V(3)Cl$_3$(7.9 g, 50 mmols) and hmpa (515 g) were fed into a reaction tube similar to that in Example 1 to prepare a complex solution (500 ml) of V(3) Cl$_3$.hmpa (0.1 mol/l). When air (1.5 l) was passed through the solution, oxygen (0.45 l, 20 mmols) was absorbed. The soluion color changed from the original red-violet color to yellow-green color. Since the solution color of the complex of vanadyl chloride with hmpa, V(4)O Cl$_3$.hmpa which is a tetravalent vanadium complex is dark green, it is presumed in view of the color difference between the both that the oxygen complex of V(3)Cl$_3$.hmpa was formed. Acetaldehyde (10 g, 227 mmols) was added to the complex solution after absorption of oxygen, and the mixture was heated to 60° C. under the atmospheric pressure. After reaction for 1.5 hour, the amount of acetic acid formed was 1.1 g (18 mmols). The yield based on the combined oxygen in the oxygen complex was 43%.

EXAMPLE 8

Titanium trichloride Ti(3)Cl$_3$ (7.7 g, 50 mmols), hmpa (270 g) and sulfolane (230 g) were fed into a reaction tube similar to that in Example 1 to prepare a complex solution (500 ml) of Ti(3)Cl$_3$.hmpa.sulfolane (1 mol/l). When air was passed through the complex solution in the same manner as in Example 7, oxygen (0.28 l, 12.5 mmols) was absorbed. The color tone changed from the original blue to orange-red. In addition, when titanium tetrachloride Ti(4)Cl$_4$ as a higher tetravalent titanium compound was added to a similar solution to the above, a yellow precipitate was formed. From this fact it is considered that an oxygen complex was formed also in the solution of Ti(3)Cl$_3$.hmpa. To this solution was added propionaldehyde (10 g, 172 mmols) and the mixture was warmed to 40° C. under the atmospheric pressure. After one hour, the resulting complex solution was analyzed according to gas chromatography. Propionic acid (1.0 g, 14 mmols) was formed. Its yield based on the oxygen complex was 56%.

EXAMPLE 9

Example 1 was repeated except that Cu(1)Cl was replaced by Cu(1)Br. As a result the amount of oxygen absorbed had no significant difference. The acetic acid yield was 94%.

EXAMPLE 10

Beads of a styrene-divinylbenzene copolymer of macroreticular (network) form (Amberlite XA D-4 made by Organo Company; particle diameter 1 mm$\phi$; specific surface area 700–800 m$^2$/g) (50 ml) were impregnated with a catalyst solution containing the oxygen complex having the composition shown in Example 1, followed by filtration by means of suction to prepare a granular catalyst, which was then filled in a hardglass reaction tube having an inner diameter of 20 mml, followed by passing acetaldehyde gas at a rate of 1 l/min. therethrough and heating up to 120° C. The resulting product contained in the exit gas was analyzed according to gas chromatography. The product was acetic acid alone and its yield based on acetaldehyde was 5% till two hours after the start of the reaction. Thereafter the exit gas was recycled to obtain an acetaldehyde yield of 85% based on the oxygen complex. Further, the feed of acetaldehyde was once stopped and the solution was cooled down to 60° C., followed by passing air therethrough to regenerate the combined oxygen consumed by the reaction and then again carrying out oxydation experiment under the above conditions to obtain similar results.

From the foregoing, it is evident that even when the complex of the present invention is supported on a porous carrier, the reaction by means of the combined oxygen in the oxygen complex advances.

In addition, it was possible to use other porous carriers such as silicates, active carbon, porous glass, etc. Further, as for the treating process after the impregnation, it was possible to employ other various processes such as filtration by means of suction, passing of heated gas, low temperature calcination, etc.

According to the present invention, when air is passed through a complex consisting of a salt of a specified transition metal and an organic phosphorous compound to form an oxygen complex and an organic compound is oxidized with the combined oxygen activated thereby, the oxygen-oxidation reaction of the organic compound is possible under normal pressures and at normal temperatures; hence it is possible to produce objective oxygen-containing organic compounds selectively and with a high yield. Further, since the amount of by-products contained in the product is small, the production steps including the subsequent purification is simplified, and since oxygen is selectively absorbed using air as an oxygen source, the same effectiveness as in the case of use of pure oxygen is obtained. Furthermore, since the oxygen absorption is irreversible, it is possible to easily remove excess free oxygen after the oxygen complex has been formed; hence the present invention is very advantageous with respect to safety.

What we claim is:

1. A process for oxiding aldehydes to produce organic acids comprising contacting said aldehyde with an oxidizing agent consisting essentially of:

a transition metal complex (M$_m$X$_n$L$_l$) capable of coordinating with oxygen, consisting of a transition metal compound (M$_m$X$_n$) and an organic phosphorus compound L as a ligand, wherein M is a transition metal belonging to at least one group selected from the group consisting of Group I, Groups IV-VII and the iron group in Group VIII of the Periodic Table; X represents an anion; ligand L represents an organic phosphorous compound; m and n represent the number of atoms of said transition metal M and said anion X respectively; and l represents the number of molecules of said ligand, wherein m, n, and l are in the range of 1 to 4; and, oxygen coordinated with the transition metal complex.

2. A process according to claim 1 wherein said anion X is selected from the group consisting of Cl$^-$, Br$^-$, I$^-$, BF$_4^-$, PF$_6^-$, SO$_4^{2-}$ and CH$_3$COO$^-$.

3. A process according to claim 1 wherein said ligand L is selected from a group consisting of alkoxy, alkyl, and amide derivatives of phosphorous and phosphoric acid.

4. A process according to claim 1 wherein said transition metal M is selected from a group consisting of CU and Ag of Group I, Ti and Zr of Group IV, V and Nb of Group V, Cr, Mo and W of Group VII, and Fe, Co, and Ni of Group VIII of the Periodic Table.

5. A process according to claim 1 wherein said transition metal complex (M$_m$X$_n$L$_l$) capable of coordinating with oxygen is supported on a porous carrier.

6. A process according to claim 1, wherein said transition metal complex (M$_m$X$_n$L$_l$) capable of coordinating with oxygen is Cu(1)Cl$_2$-hexamethylphosphoramide.

7. A process according to claim 3 wherein said ligand L is hexamethylphosphoramide hexamethylphosphoramide.

8. A process for oxidizing an aldehyde to produce a carboxylic acid, comprising contacting said aldehyde with an oxygen complex having a formula hexamethylphosphoramide.ClCu(1)—O$_2$—Cu(1)Cl.hexamethylphosphoramide.

9. A process according to claim 8 wherein said oxygen complex is supported on a porous carrier.

* * * * *